(12) United States Patent
Wood (10) Patent No.: US 12,332,122 B2
(45) Date of Patent: Jun. 17, 2025

(54) CONFIGURABLE THERMAL TESTING SYSTEM AND METHOD

(71) Applicant: Raytheon Company, Arlington, VA (US)

(72) Inventor: Adam C. Wood, Oro Valley, AZ (US)

(73) Assignee: Raytheon Company, Arlington, VA (US)

(*) Notice: Subject to any disclaimer, the term of this patent is extended or adjusted under 35 U.S.C. 154(b) by 594 days.

(21) Appl. No.: 17/546,575

(22) Filed: Dec. 9, 2021

(65) Prior Publication Data

US 2023/0184595 A1    Jun. 15, 2023

(51) Int. Cl.
*G01K 11/125* (2021.01)
*G02B 26/08* (2006.01)

(52) U.S. Cl.
CPC ........ *G01K 11/125* (2013.01); *G02B 26/0816* (2013.01)

(58) Field of Classification Search
None
See application file for complete search history.

(56) References Cited

U.S. PATENT DOCUMENTS

| | | | |
|---|---|---|---|
| 3,905,352 A | 9/1975 | Arnold | |
| 5,242,224 A | 9/1993 | Shunsuke et al. | |
| 6,500,760 B1* | 12/2002 | Peterson | H01L 24/85 |
| | | | 438/586 |
| 8,882,274 B1* | 11/2014 | Otten, III | A61B 3/0008 |
| | | | 351/205 |
| 2004/0114122 A1* | 6/2004 | Teeuwen | G03F 7/70141 |
| | | | 355/68 |
| 2008/0079930 A1* | 4/2008 | Klarenbeek | G03F 7/70116 |
| | | | 430/311 |
| 2012/0263208 A1 | 10/2012 | Speier | |

(Continued)

FOREIGN PATENT DOCUMENTS

| | | |
|---|---|---|
| JP | 2000019108 A | 1/2000 |
| JP | 2003185607 A | 7/2003 |
| JP | 2019138649 A | 8/2019 |

OTHER PUBLICATIONS

Pozzobon Victor et al : "High heat flux mapping using infrared images processed by inverse methods: An application to solar concentrating systems", Solar Energy, vol. 117 , Jul. 1, 2015 (Jul. 1, 2015) , pp. 29-35.

(Continued)

*Primary Examiner* — Erica S Lin
(74) *Attorney, Agent, or Firm* — Schwegman Lundberg & Woessner, P.A.

(57) ABSTRACT

A thermal testing system includes a mirror array, having tiltable mirror elements, that reflects thermal radiation output from a radiative heat source. The mirror elements can be tilted as required to achieve a desired radiative heating profile, for example on an object to be tested. The thermal testing system may also have additional mirror arrays, and/or a heat sink. The radiative heat source may be stationary, and may have different zones (for example with different bulbs) that may be controlled separately, for example by having separate illumination intensity control for the different zones. The testing system may be configured for different tests, and/or to provide time-varying heating profiles.

20 Claims, 3 Drawing Sheets

(56) References Cited

U.S. PATENT DOCUMENTS

2015/0331198 A1* 11/2015 Frisken ............... G02B 6/3546
                                                        385/17
2017/0371106 A1* 12/2017 Cruz .................. G02B 26/0841

OTHER PUBLICATIONS

International Search Report and Written Opinion mailed Jan. 9, 2023 in corresponding International Application No. PCT/US2022/077646.
Roger A. Fields, "Flight Vehicle Thermal Testing With Infrared Lamps," NASA Technical Memorandum 4336, Jan. 1992.
"International Application Serial No. PCT/US2022/077646, International Preliminary Report on Patentability mailed Jun. 20, 2024", 8 pgs.

* cited by examiner

CONFIGURABLE THERMAL TESTING SYSTEM AND METHOD

FIELD

The present disclosure is in the field of devices and methods for thermal testing, such as thermal testing of devices.

BACKGROUND

Achieving flight-like heating distributions on any portion of a flight vehicle design typically requires testing in a high-enthalpy convective wind tunnel that can be very expensive. The primary alternative is to use quartz lamps that can output high heat fluxes at relatively low cost, with the downside being that the lamps are relatively large compared to vehicles the size of missiles and therefore cannot achieve the spatial resolution required to replicate flight-like heating distributions. When temperature gradients are the primary structural driver, such as with hypersonic vehicles that experience high temperature gradients and low external pressure loads, replicating the distribution of heating is an important factor.

SUMMARY

A thermal testing system includes configurable mirror arrays that reflect thermal radiation from a heat source.

A thermal testing system includes a configurable radiative heat source.

A thermal testing system is reconfigurable to provide a large variety of possible setups for heating profiles to be achieved, for example on a test object.

According to an aspect of the disclosure, a thermal testing system includes: a radiative heat source; and a mirror array for reflecting thermal radiation output from the radiative heat source, toward an object to be heated; wherein the mirror array includes plural individually-tiltable mirror elements.

According to an embodiment of any paragraph(s) of this summary, a thermal testing system further includes a controller operatively coupled to the mirror elements, for controlling orientation of the mirror elements.

According to an embodiment of any paragraph(s) of this summary, the controller controls operation of actuators mechanically coupled to respective of the mirror elements.

According to an embodiment of any paragraph(s) of this summary, the actuators include mechanical actuators.

According to an embodiment of any paragraph(s) of this summary, the actuators include electromechanical actuators.

According to an embodiment of any paragraph(s) of this summary, the mirror elements include at least 20 mirror elements.

According to an embodiment of any paragraph(s) of this summary, the mirror elements include at least 100 mirror elements.

According to an embodiment of any paragraph(s) of this summary, the mirror elements include at least 1000 mirror elements.

According to an embodiment of any paragraph(s) of this summary, the mirror elements each have a size of at least 2.5 cm×2.5 cm (1 inch×1 inch).

According to an embodiment of any paragraph(s) of this summary, the mirror elements each have a size of at least 5 cm×5 cm (2 inches×2 inches).

According to an embodiment of any paragraph(s) of this summary, the mirror elements adjoin one another.

According to an embodiment of any paragraph(s) of this summary, the mirror elements are substantially rectangular.

According to an embodiment of any paragraph(s) of this summary, the mirror array is rectangular.

According to an embodiment of any paragraph(s) of this summary, the mirror elements have reflective surfaces made up of radiation-reflective material.

According to an embodiment of any paragraph(s) of this summary, the radiation-reflective material includes gold.

According to an embodiment of any paragraph(s) of this summary, the mirror array is a first mirror array; and the thermal testing system further includes one or more additional mirror arrays that further reflect at least some of the thermal radiation that is initially reflected by the first mirror array.

According to an embodiment of any paragraph(s) of this summary, the one or more additional mirror arrays include a second mirror array and a third mirror array.

According to an embodiment of any paragraph(s) of this summary, the third mirror array further reflects at least some of the thermal radiation that is reflected by the second mirror array, having initially been reflected by the first mirror array.

According to an embodiment of any paragraph(s) of this summary, the thermal testing system further includes a heat sink to which at least some of the thermal radiation output from the radiative heat source may be directed.

According to an embodiment of any paragraph(s) of this summary, the heat sink includes a metal plate.

According to an embodiment of any paragraph(s) of this summary, the heat sink is liquid cooled.

According to an embodiment of any paragraph(s) of this summary, the heat source includes quartz lamps.

According to an embodiment of any paragraph(s) of this summary, the quartz lamps are cooled quartz lamps.

According to an embodiment of any paragraph(s) of this summary, the heat source includes silicon carbide lamps.

According to an embodiment of any paragraph(s) of this summary, the thermal testing system further includes an intensity control for controlling output intensity of the heat source.

According to an embodiment of any paragraph(s) of this summary, the intensity control may independently control the output intensity of different zones of the heat source.

According to another aspect of the disclosure, a method of configuring a thermal testing system includes the steps of: providing a radiative heat source of the thermal testing system; and tilting mirror elements of a mirror array of the thermal testing system; wherein the tilting of the mirror elements reflects thermal radiation from the radiative heat source to achieve a desired heating profile at a test location.

According to an embodiment of any paragraph(s) of this summary, the tilting is accomplished using actuators that are operatively coupled to the mirror elements.

According to an embodiment of any paragraph(s) of this summary, the titling includes controlling the actuators using a controller of the thermal testing system.

According to yet another aspect of the disclosure, a method of performing thermal testing using a thermal testing system, includes the steps of: configuring the thermal testing system, the configuring including tilting mirror elements of a mirror array of the thermal testing system; and reflecting, using the mirror elements, thermal radiation from a radiative heat source of the thermal testing system, to achieve a desired heating profile at a test location.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

A thermal testing system includes a mirror array, having tiltable mirror elements, that reflects thermal radiation output from a radiative heat source. The mirror elements can be tilted as required to achieve a desired radiative heating profile, for example on an object to be tested. The thermal testing system may also have additional mirror arrays, and/or a heat sink. The radiative heat source may be stationary, and may have different zones (for example with different lamps or bulbs) that may be controlled separately, for example by having separate illumination intensity control for the different zones. The testing system may be configured for different tests, and/or to provide time-varying heating profiles.

Figure 1:
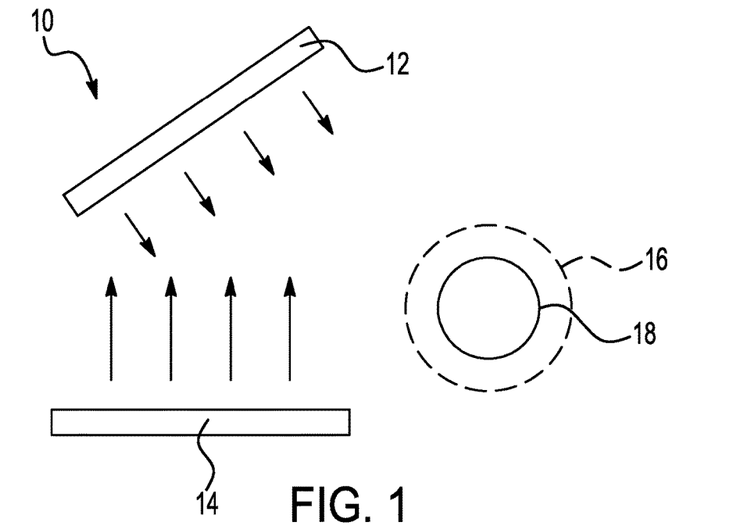
FIG. 1 is a schematic view of a thermal testing system according to an aspect of the disclosure.
Figure 2:
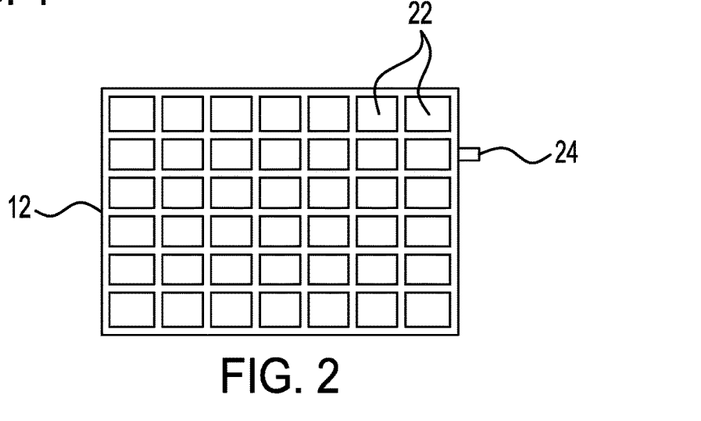
FIG. 2 is a view of a mirror array of the thermal testing system of FIG. 1.

FIG. 1 shows a thermal testing system 10 that uses an array of mirrors 12 to direct radiative heat from a heat source 14, to a target area 16, where a test article 18 may be located, in a desired configuration. With reference in addition to FIG. 2, the mirror array 12 includes a series of mirror elements 22, for example in a rectangular array, with rows and columns. The mirror elements 22 are individually separately tiltable, for example using separate actuators that are able to tilt (change orientation) in one or more directions, for example in two or more directions (multiple directions). The tiling may be accomplished by one or more actuators for each of the mirror elements, for example. The tilting may be done at hinges relative to yokes that support the mirror elements 22.

The tilting of the mirror elements 22 of the mirror array 12 may be achieved to achieve a desired radiative heating profile in the target area 16, for example to achieve a desired heating profile on the test article 18. Thus the mirror elements 22 may be tilted to direct more of the illumination from the heat source 14 to areas where more heating is desired, and away from areas where less heating is desired. For example, a heating profile may be configured to simulate heating from a scenario simulating an actual event, for example simulating a heating profile encountered by a missile in flight, for example in a hypersonic flight.

There may be any of a wide variety of numbers of the mirror elements 22. For example the array 12 may have at least 20 mirror elements, at least 100 mirror elements, or at least 1000 mirror elements, to give a few non-limiting values.

The mirror elements 22 may have any of a variety of suitable sizes, each for example being at least 2.5 cm×2.5 cm (1 inch×1 inch), or at least 5 cm×5 cm (2 inches×2 inches). These example sizes are non-limiting, and a wide variety of other suitable sizes for the mirror elements 22 are possible.

The mirror elements 22 may have any of a variety of suitable shapes, for example being substantially rectangular, with adjacent of the elements 22 abutting or adjoining one another (subject to the tilting). The array 12 of the mirror elements 22 may have an overall rectangular shape, though other suitable shapes are possible.

The mirror elements 22 may have suitable radiation-reflecting surfaces, for reflecting the thermal radiation from the heat source 14 (FIG. 1). An example of suitable radiation-reflective material for the surfaces of the mirror elements 22 is gold, such as gold foil or gold plating on the surface of the mirror elements 22.

The mirror elements 22 may be individually tilted by respective actuators 24. The actuators 24 may be mechanical or electromechanical actuators, to give non-limiting broad examples.

The test article 18 may be any of a wide variety of objects for which thermal testing is desired. Examples include flight vehicles, such as high-speed missiles, or parts of such vehicles.

Figure 3:
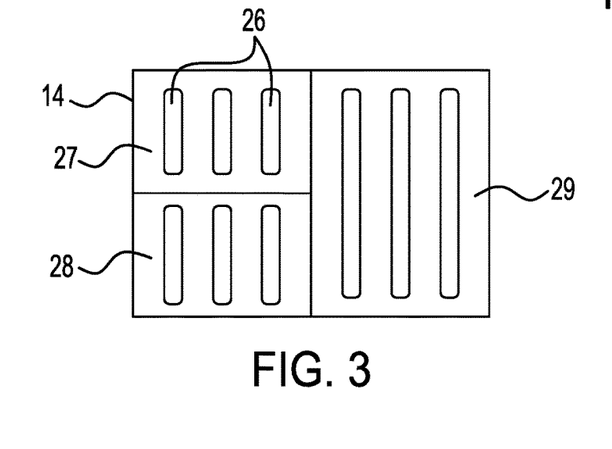
FIG. 3 is a view of a radiative heat source of the thermal system of FIG. 1.

The heat source 14 may be or may include any of a variety of sources of radiative heat. Examples include lamps, such as quartz lamps (for example cooled quartz lamps) and silicon carbide lamps, and lasers. The heat source 14 may have multiple individual heat sources, such as by having multiple quartz lamps 26, as illustrated in FIG. 3. The heat source 14 may be capable of providing a variety of heating intensities, for example by varying the electrical current supplied to the lamps. The lamps (or other individual heat sources) can be individually controlled in intensity, groups or zones of the lamps may be separately controlled in intensity, and/or lamps may have their intensities all controlled together. For example there may be three separately controllable zones 27, 28, and 29, of the heat source 14. The zones 27-29 may have the same or similar numbers of the lamps 26, or may vary from one to another in the number of the lamps 26. Use of the zones 27-29 may allow for reduced heating when testing smaller areas/objects, and/or may allow for other flexibility for the thermal testing system. The lamps (or other individual heat sources) 26 may all be substantially similar to one another in terms of their radiative heat characteristics, or there may be differences in the heating characteristics of the various individual heat sources (lamps or lasers, for example).

Figure 4:
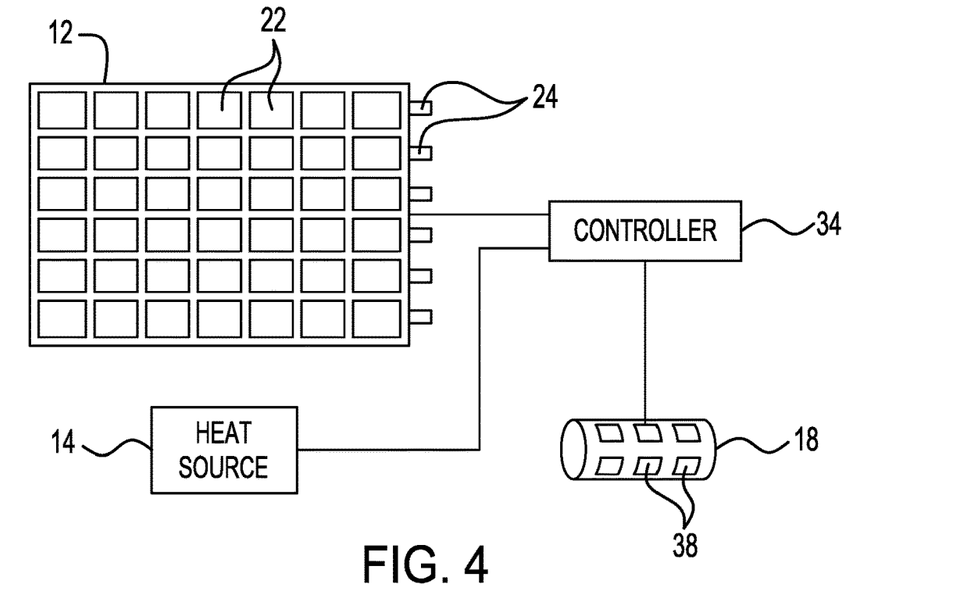
FIG. 4 is a schematic diagram showing control in the thermal testing system of FIG. 1.

With reference now in addition to FIG. 4, the tilting of the mirror elements 22 by the respective actuators 24 may be controlled by a controller 34. The controller 34 may be any of a variety of control devices. Nonlimiting examples include PID controllers, computers, processors, and integrated circuits of various sorts. The controller 34 may receive information regarding a desired heat profile. In addition the controller 34 may possibly receive information regarding measurements on the test article 18. For example there may be thermocouples, IR sensors, or other temperature measuring devices 38 on surface portions of the test article 18. Signals from the thermocouples or IR sensors (or other temperature measuring devices) 38 may be used for feedback, to allow for adjustment to reach the desired heating profile (or to confirm that the desired heating profile has been reached).

The controller 34 may also control intensity in output of the radiative heat source 14, or in parts of the radiative heat source 14.

Figure 5:
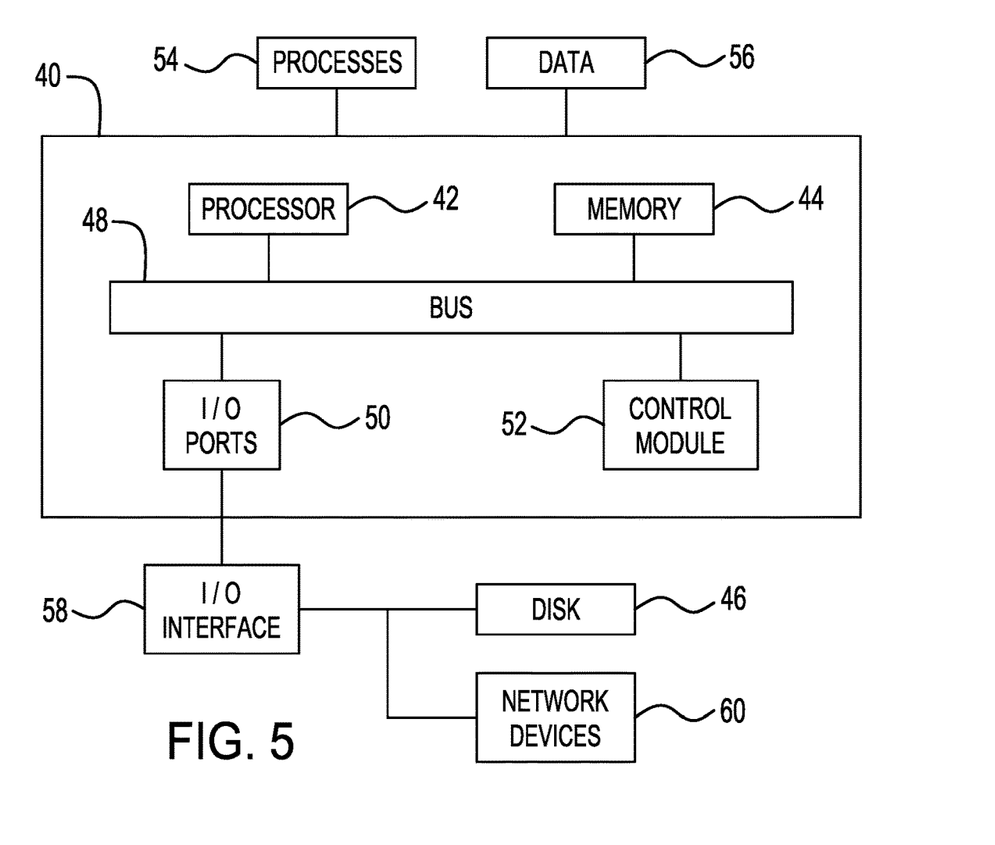
FIG. 5 is a block diagram of a computer usable as a controller as part of a thermal testing system, according to an aspect of the disclosure.

The controller 34 may be part of a general computer, such as an exemplary apparatus/machine 40 shown in FIG. 5, for carrying out the operations described above. The machine 40 includes a processor 42, a memory 44, and I/O Ports (or transmit/receive blocks) 50 operably connected by a bus 48. The machine 40 may be part of a system that includes the thermal testing system 10 (FIG. 1).

In one example, the machine 40 may receive input signals including the wireless incoming signal, and/or data concerning signals, etc., via, for example, I/O Ports 50 or I/O Interfaces 58. The machine 40 may also include various modules for carrying out the method steps described herein, such as a control module 52. Such modules may be implemented in the machine 40 as hardware, firmware, software, or a combination thereof and, thus, the machine 40 and its components may provide means for performing functions described and/or claimed herein.

The processor 42 can be a variety of various processors including dual microprocessor and other multi-processor architectures. The memory 44 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 46 may be operably connected to the machine 40 via, for example, an I/O Interfaces (e.g., card, device) 58 and an I/O Ports 50. The disk 46 can include, but is not limited to, devices like a magnetic disk drive, a solid-state disk drive, a floppy disk drive, a tape drive, a Zip drive, a flash memory card, or a memory stick. Furthermore, the disk 46 can include optical drives like a CD-ROM, a CD recordable drive (CD-R drive), a CD rewriteable drive (CD-RW drive), or a digital video ROM drive (DVD ROM). The memory 44 can store processes 54 or data 56, for example. The disk 46 or memory 44 can store an operating system that controls and allocates resources of the machine 40.

The bus 48 can be a single internal bus interconnect architecture or other bus or mesh architectures. While a single bus is illustrated, it is to be appreciated that machine 40 may communicate with various devices, logics, and peripherals using other busses that are not illustrated (e.g., PCIE, SATA, Infiniband, 1394, USB, Ethernet). The bus 48 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 40 may interact with input/output devices via I/O Interfaces 58 and I/O Ports 50. Input/output devices can include, but are not limited to, a keyboard, a microphone, a pointing and selection device, cameras, video cards, displays, disk 46, network devices 60, and the like. The I/O Ports 50 can include but are not limited to, serial ports, parallel ports, and USB ports.

The machine 40 can operate in a network environment and thus may be connected to network devices 60 via the I/O Interfaces 58, or the I/O Ports 50. Through the network devices 60, the machine 40 may interact with a network. Through the network, the machine 40 may be logically connected to remote computers. The networks with which the machine 40 may interact include, but are not limited to, a local area network (LAN), a wide area network (WAN), and other networks. The network devices 60 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 60 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

Figure 6:
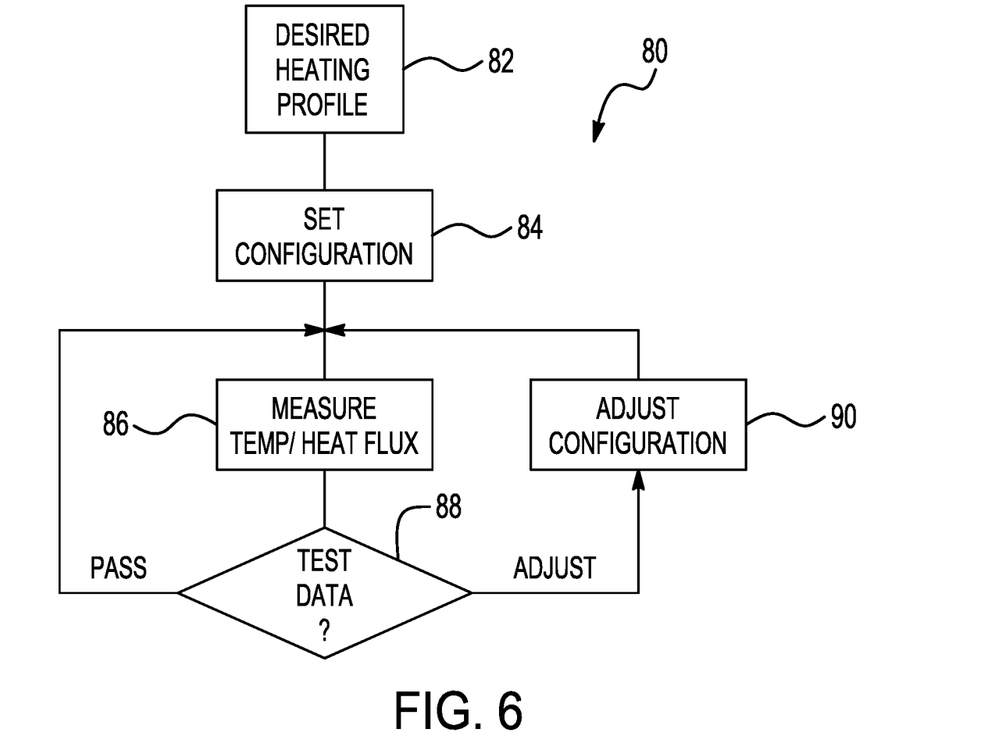
FIG. 6 is a high-level flow chart of a method for configuring/using a thermal testing system, according to an aspect of the disclosure.

FIG. 6 shows a high-level flow chart of a method 80 an algorithm for carrying out the process described above, for example in a controller such as the machine 40 (FIG. 5). In step 82 a desired heating profile, such as for the test area 16 (FIG. 1) or the test object 18 (FIG. 1), is received by the controller 34 (FIG. 4). The desired heating profile may be expressed in terms of a thermal radiation profile, and/or as a desired temperature profile at various locations in the test area 16 and/or on the test object 18. The heating profile may be a constant profile over time, or may vary over time, perhaps simulating variations in heating during a high-speed flight of an object such as a missile. The controller 34 may have a memory that allows storage and retrieval of one or more desired heating profiles.

In step 84 an initial setup is performed, based on the desired heating profile. This initial setup may involve tilting of various of the mirror elements 22 (FIG. 2) on one or more mirror arrays (such as the mirror array 12 (FIG. 1)), setting intensities of various of the lamps 26 (FIG. 3) or the zones 27-29 (FIG. 2) of the heat source 14 (FIG. 1), or the overall intensity of the heat source 14.

In step 86 measurements are made of temperature on the test article 18 (FIG. 1), and/or of heat flux at various locations in the test area 16 (FIG. 1). This may be done, for example, using the temperature measuring devices 38 (FIG. 4). In step 88 the data from the measurements in step 86 is examined to determine whether adjustments or changes in the configuration of the thermal testing system 10 (FIG. 1) are needed. A predetermined temperature criterion may be applied, such as for example if the temperature measurements are within 0.1 K or 1 K of the desired values for the desired heating profile. As another example, the criterion may include or involve the heat flux being within a certain percentage or a certain value of heat flux of the heat flux values for the desired heating profile.

If the criterion/criteria for the measurements are not met, then adjustments in the configuration of the thermal testing system 10 (FIG. 1) are made in step 90. The adjustments may involve tilting of mirror elements, for example to overlap or otherwise concentrate the output of multiple mirror elements to concentrate heating, or to spread out the output of various mirror elements. Alternatively or in addition the adjustments may include increasing or decreasing heating intensity of all or parts (e.g., zones) of the heating source 14 (FIG. 1). The controller 34 (FIG. 4) may be configured to prioritize different types of adjustments on various criteria.

The process described above may be performed as a calibration operation, in advance of actual testing of an object.

It will be appreciated that one or more of the steps described above may be performed or performable manually, without the use of a controller. For example, mirror elements may be tilted manually (either directly or through the action of actuators), and/or intensity of a heat source may be set by an operator.

Figure 7:
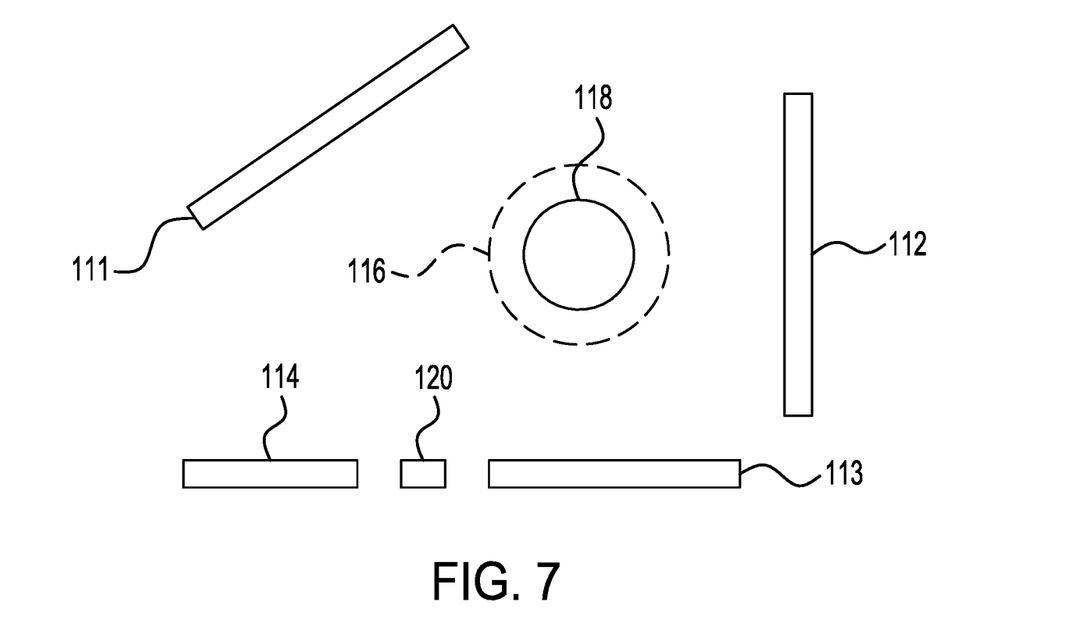
FIG. 7 is a schematic view of a thermal testing system according to another aspect of the disclosure.

FIG. 7 shows an alternate embodiment, a thermal testing system 110 that includes additional elements beyond those of the thermal testing system 10 (FIG. 1). These additional elements may be considered optional, in the sense that the thermal testing system 110 will operate without some or all of the additional elements, though perhaps in a limited way or with reduced effectiveness.

The thermal testing system 110 includes multiple mirror arrays 111, 112, and 113, all of which may be employed to reflect thermal radiation from a heat source 114 to a target area 116, where a test object 118 may be located. The mirror arrays 111-113 may be similar in any or all characteristics to the mirror array 12 (FIG. 1) described above. By employing multiple mirror arrays 111-113 the flexibility in coverage of the target area 116, allowing all sides of the test object 118 to be reached, and additionally potentially allowing greater flexibility in the possible ranges of different heating levels that may be obtainable, through multiple reflections off of the multiple mirror arrays 111-113.

The thermal testing system 110 may also include a heat sink 120. The reflecting mirror elements of one or more of the mirror arrays 111-113 may be configured (tilted) to direct unneeded radiative heat to the heat sink 120. This may be done, for example, to avoid undesirably heating up the environment in the vicinity of the thermal testing system 110. The heat sink 120 may be a metal plate, such as an aluminum plate. Alternatively (or in addition), the heat sink 120 may be liquid cooled, to remove heat from the heat sink 120.

There may be more or fewer mirror arrays than the three mirror arrays 111-113 in the illustrated embodiment of the thermal testing system 110 shown in FIG. 7. Different numbers of mirror arrays may be used for direct reflection of thermal radiation to the test area 116, and/or for indirect reflection (reflection multiple times before reaching the test area 116).

The mirror arrays 111-113 are depicted in two dimensions, but is should be appreciated that the mirror arrays 111-113 may be configured to produce three dimensional reflections. The reflections may be such as to allow thermal radiation to reach all parts of the test area 116, and/or all sides (all surfaces) of the test object 118.

The multiple mirror arrays 111-113 may have their mirror elements controlled by a single controller, to achieve any of a variety of various heating profiles. The thermal testing system 110 may be advantageously reconfigured quickly to perform different tests and/or different types of tests. It is flexible as well for testing items of different sizes.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A thermal testing system comprising:
   a radiative heat source;
   a plurality of mirror arrays, each said mirror array including a plurality of individually-tiltable mirror elements for collectively reflecting thermal radiation output from the radiative heat source toward an object to be heated; and
   a controller operatively coupled to the mirror elements of the plurality of mirror arrays to control the orientation of the individual mirror elements to heat all sides of the object to collectively achieve a desired heating profile of the object.

2. The thermal testing system of claim 1, wherein the controller controls operation of actuators mechanically coupled to respective of the mirror elements.

3. The thermal testing system of claim 1, wherein the mirror elements each have a size of at least 2.5 cm×2.5 cm.

4. The thermal testing system of claim 1, wherein the mirror elements have reflective surfaces made up of radiation-reflective material selected to reflect the thermal radiation from the radiative source.

5. The thermal testing system of claim 1, wherein the plurality of mirror arrays include a first mirror array, a second mirror array and a third mirror array, wherein the third mirror array further reflects at least some of the thermal radiation that is reflected by the second mirror array, having initially been reflected by the first mirror array.

6. A thermal testing system comprising:
   a radiative heat source;
   a heat sink;
   a mirror array including a plurality of individually-tiltable mirror elements for collectively reflecting thermal radiation output from the radiative heat source toward an object to be heated and the heat sink; and
   a controller operatively coupled to the mirror elements to control the orientation of the individual mirror elements to collectively achieve a desired heating profile of the object,
   wherein at least some of the thermal radiation output from the radiative heat source that is unneeded to heat the object is directed to the heat sink by the mirror elements.

7. The thermal testing system of claim 6, wherein the heat sink includes a metal plate.

8. The thermal testing system of claim 6, wherein the heat sink is liquid cooled.

9. The thermal testing system of claim 1, wherein the heat source includes quartz lamps.

10. The thermal testing system of claim 1,
further comprising an intensity control for controlling output intensity of the heat source; and
wherein the intensity control may independently control the output intensity of different zones of the heat source.

11. A method of configuring a thermal testing system, the method comprising:
providing a radiative heat source of the thermal testing system; and
tilting mirror elements of a plurality of mirror arrays of the thermal testing system;
wherein the tilting of the mirror elements reflects thermal radiation from the radiative heat source to heat all sides of an object to achieve a desired heating profile of the object.

12. The method of claim 11, wherein the tilting is accomplished using actuators that are operatively coupled to the mirror elements.

13. The method of claim 12, wherein the tilting includes controlling the actuators using a controller of the thermal testing system.

14. A method of performing thermal testing using a thermal testing system, the method comprising:
configuring the thermal testing system, the configuring including tilting mirror elements of a mirror array of the thermal testing system; and
reflecting, using the mirror elements, thermal radiation from a radiative heat source of the thermal testing system; toward an object to achieve a desired heating profile of the object
reflecting, using the mirror elements, at least some of the thermal radiation from the radiative heat source that is unneeded to heat the object to achieve the desired heating profile to a heat sink.

15. The thermal testing system of claim 1, further comprising:
a temperature measuring device configured to make temperature measurements of the object,
wherein the controller is responsive to the temperature measurements to vary the orientation of the individual mirror elements to concentrate or spread out thermal radiation onto the object to achieve the desired heating profile of the object.

16. The thermal testing system of claim 15, wherein the radiative heat source emits in the infrared (IR) band and the temperature measuring device includes one or more IR sensors.

17. The method of claim 11, further comprising:
making temperature measurements of the object,
responsive to the temperature measurements, varying the orientation of the individual mirror elements to concentrate or spread out thermal radiation at the test location to achieve the desired heating profile of the object.

18. The method of claim 17, wherein the radiative heat source emits in the infrared (IR) band and wherein the temperature measurements of the objects are made by one or more IR sensors.

19. The method of claim 11, wherein tilting the mirror elements of the plurality of mirror arrays reflects at least some of the thermal radiation output from the radiative heat source that is unneeded to heat the object to achieve the desired heating profile to a heat sink.

20. The method of claim 14, wherein the configuring includes tilting mirror elements from a plurality of mirror arrays, wherein reflecting includes using the mirror elements from the plurality of mirror arrays to reflect the thermal radiation from the radiative heat source to heat all sides of the object to achieve the desired heating profile.

* * * * *

UNITED STATES PATENT AND TRADEMARK OFFICE
CERTIFICATE OF CORRECTION

PATENT NO. : 12,332,122 B2  
APPLICATION NO. : 17/546575  
DATED : June 17, 2025  
INVENTOR(S) : Adam C. Wood Page 1 of 1

It is certified that error appears in the above-identified patent and that said Letters Patent is hereby corrected as shown below:

In the Claims

In Column 9, Line 31, in Claim 14, after "system;", delete "and"

In Column 9, Line 34, in Claim 14, delete "system;" and insert --system-- therefor In Column 9, Line 35, in Claim 14, delete "object" and insert --object; and-- therefor Signed and Sealed this  
Twentieth Day of January, 2026

John A. Squires  
*Director of the United States Patent and Trademark Office*